United States Patent [19]
Yoshikawa et al.

[11] Patent Number: 5,972,480
[45] Date of Patent: Oct. 26, 1999

[54] TRANSFER SHEET FOR PROVISION OF PATTERN ON THREE-DIMENSIONAL OBJECT AND TRANSFER METHOD USING THE SAME

[75] Inventors: Hirohisa Yoshikawa; Haruo Ono; Reiko Kan, all of Shinjuku-Ku, Japan

[73] Assignee: Dai Nippon Printing Co., Ltd., Japan

[21] Appl. No.: 08/900,359

[22] Filed: Jul. 25, 1997

[30] Foreign Application Priority Data

Jul. 26, 1996 [JP] Japan .................................. 8-214145

[51] Int. Cl.⁶ ....................................................... B32B 9/00
[52] U.S. Cl. .......................... 428/195; 428/202; 428/207; 428/212; 428/341; 428/352; 428/409; 428/423.7; 428/480; 428/500; 428/913; 503/227; 156/232; 156/240; 156/277
[58] Field of Search ..................................... 428/195, 212, 428/409, 480, 913, 914, 42.1, 202, 343, 352, 341, 207, 476.9, 500, 423.7; 503/227; 156/232, 234, 240, 277

[56] References Cited

U.S. PATENT DOCUMENTS

| | | | |
|---|---|---|---|
| 4,027,345 | 6/1977 | Fujisawa et al. | 8/2.5 R |
| 4,314,814 | 2/1982 | Deroode | 8/471 |
| 4,369,157 | 1/1983 | Conner | 264/246 |
| 4,971,854 | 11/1990 | Hinishi et al. | 428/195 |
| 5,114,520 | 5/1992 | Wang, Jr. et al. | 156/240 |

FOREIGN PATENT DOCUMENTS

| | | |
|---|---|---|
| 0 623 503 A1 | 11/1994 | European Pat. Off. . |
| 44 25 342 A1 | 1/1995 | Germany . |
| 44 32 018 A1 | 5/1996 | Germany . |
| WO 89/07530 | 8/1989 | WIPO . |
| WO 92/05030 | 4/1992 | WIPO . |

OTHER PUBLICATIONS

Patent abstracts of Japan, vol. 006, No. 228 (M–171), Nov. 13, 1982 & JP 57 129731 A (Matsushita Denki Sangyo KK), Aug. 11, 1982 Abstract.

*Primary Examiner*—Timothy Speer
*Assistant Examiner*—Abraham Bahta
*Attorney, Agent, or Firm*—Parkhurst & Wendel, L.L.P

[57] ABSTRACT

There is provided a transfer sheet for provision of a pattern on a three-dimensional object, comprising: an olefinic thermoplastic elastomer film as a substrate film; and at least a pattern layer as a transfer layer provided on the substrate.

3 Claims, 6 Drawing Sheets

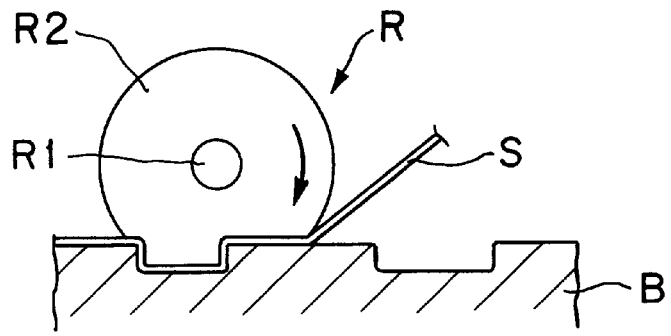
F I G. 4
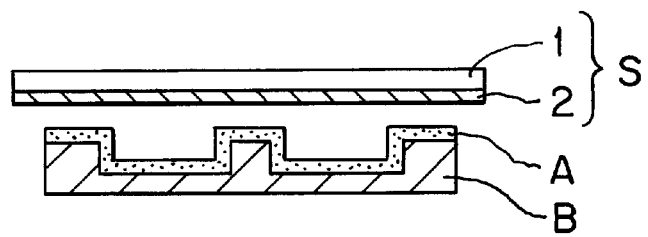
F I G. 5 (A)
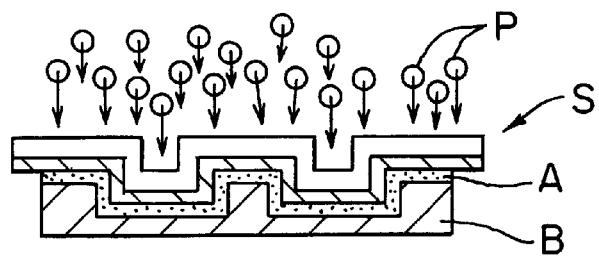
F I G. 5 (B)
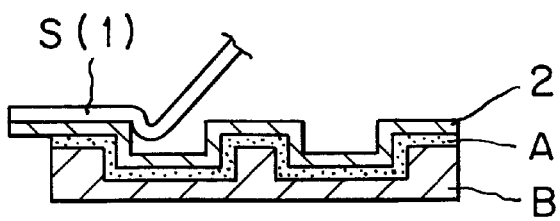
F I G. 5 (C)

TRANSFER SHEET FOR PROVISION OF PATTERN ON THREE-DIMENSIONAL OBJECT AND TRANSFER METHOD USING THE SAME

BACKGROUND OF THE INVENTION

1. Field of the Invention

The present invention relates to a transfer sheet for use in the preparation of a three-dimensional object with a pattern transferred on the surface thereof.

2. Background Art

In transferring a pattern on the surface of a three-dimensional object, such as an injection molded article of a resin or a wooden shaped object, a vinyl chloride resin film capable of being formed into a three-dimensional shape has hitherto been extensively used as a substrate for a transfer sheet. Transfer sheets of this type are disclosed in, for example, (1) Japanese Patent Publication No. 69759/1994, (2) Japanese Patent Publication No. 29518/1995, and (3) Japanese Patent Publication No. 100398/1995. The transfer sheet (1) comprises a pattern layer, formed of a releasable cellulosic ink or the like, directly provided on a substrate. The transfer sheets (2) and (3) have the same construction as the transfer sheet (1), except that the pattern layer directly provided on the substrate in the case of the transfer sheet (2) and the release layer directly provided on the substrate in the case of the transfer sheet (3) are formed of one member selected from polyvinylbutyral, a cellulose acetate propionate resin and a chlorinated polypropylene resin.

In the transfer sheet (1), however, printing for directly providing the pattern layer on the substrate causes a solvent to attack the vinyl chloride resin film as the substrate, posing a problem of unstable releasability of the substrate. In the transfer sheet (2), a plasticizer contained in the vinyl chloride resin film as the substrate bleeds out, here again posing a problem of unstable releasability of the substrate. In the transfer sheet (3), resins usable in the release layer are disadvantageously limited to specific resins, that is, polyvinyl butyral, a cellulose acetate propionate resin, and a chlorinated polypropylene resin.

Thus, in decorating the surface of a three-dimensional object, the vinyl chloride resin film has good formability but is not always satisfactory as the substrate of the transfer sheet.

In order to overcome this problem, for example, (4) Japanese Patent Publication No. 110550/1995 discloses transfer sheets using as the substrate, besides the vinyl chloride film, other plastic films, such as polystyrene resin, acrylonitrile resin, and ABS resin films. In the transfer sheet (4), however, an anchor layer should be provided on the substrate in order to improve the adhesion of the plastic film to other layer(s). Therefore, the construction of the transfer sheet is inevitably such that a release layer, a pattern layer and the like are provided on the anchor layer. The presence of the anchor layer and the release layer narrows a suitable temperature range for thermoforming of the transfer sheet.

Accordingly, the present inventor has made tests and studies on a transfer sheet using a polyethylene film or a polypropylene film as the substrate film with a view to developing a transfer sheet not using the vinyl chloride resin film substrate and not requiring the provision of any auxiliary layer such as an anchor layer, the substrate film having suitable releasability and formability to a shape conforming to the shape of the object. The transfer sheet using the polyethylene or polypropylene film is effective also as an alternative to the transfer sheet using the vinyl chloride resin film which evolves hydrochloric acid gas upon incineration. The transfer sheet using the polyethylene or polypropylene substrate film raises problems including that the polyethylene or polypropylene film has high crystallinity and rapidly softens at the melting point, narrowing the range of acceptable forming conditions, and, in addition, when stretched by heat at the time of forming, creates partial whitening due to necking, causing the elongation of the whitened portion to be rendered larger than that of the other portion, that is, the elongation to become uneven.

SUMMARY OF THE INVENTION

The present inventor has found that use of an olefinic thermoplastic elastomer film as a substrate can provide a transfer sheet, for provision of a pattern on a three-dimensional object, free from the above problems.

Thus, the transfer sheet, for provision of a pattern on a three-dimensional object, according to the present invention comprises: an olefinic thermoplastic elastomer film as a substrate film; and at least a pattern layer as a transfer layer provided on the substrate.

According to the transfer sheet of the present invention, since an olefinic thermoplastic elastomer is used as the substrate, the substrate has good releasability from various resins constituting the transfer layer, such as a pattern layer, and excellent elongation for forming into a shape conforming to the shape of the three-dimensional object and, hence, can be transferred onto a three-dimensional object in the same manner as used in the case of the vinyl chloride resin.

In particular, since the olefinic thermoplastic elastomer basically has no polarity, the range of selection of resins usable as the release layer is much broader than that in the case of the conventional vinyl chloride resin film. This makes it possible to use various resins for the release layer which is to be transferred onto the object. Thus, various properties can be imparted to the resultant three-dimensional object with a pattern.

Further, the olefinic resin is a thermoplastic elastomer and, hence, has lower crystallinity than the conventional polyolefin resin. Therefore, creation of an uneven portion, distortion or the like in the pattern due to necking at the time of forming into a three-dimensional shape can be avoided. Further, a change in fluidity and plasticity of the resin with a change in temperature is more moderate, and, hence, a fluctuation in temperature during the forming is less likely to affect the results, broadening the range of acceptable forming conditions.

Furthermore, regarding a waste material derived from the transfer sheet, since the substrate is made of an olefinic resin, unlike the conventional vinyl chloride resin substrate, the substrate, upon incineration, does not evolve a hydrochloric acid gas, offering a great advantage. associated with the environmental protection of the earth.

BRIEF DESCRIPTION OF THE DRAWINGS

FIG. 4 is an explanatory diagram showing an elastic roller transfer method which is still another embodiment of the transfer method for transferring a pattern onto a three-dimensional object using the transfer sheet according to the present invention;

FIGS. 5 (A) to (C) are explanatory diagrams showing a transfer method utilizing a solid particle impact force which is a further embodiment of the transfer method for transferring a pattern onto a three-dimensional object using the transfer sheet according the present invention;

FIG. 13 (B) is a partially enlarged, perspective view of FIG. 13 (A).

DETAILED DESCRIPTION OF THE INVENTION

Embodiments of the transfer sheet for provision of a pattern on a three-dimensional object according to the present invention will be described in more detail with reference to the accompanying drawings.

Figure 1:
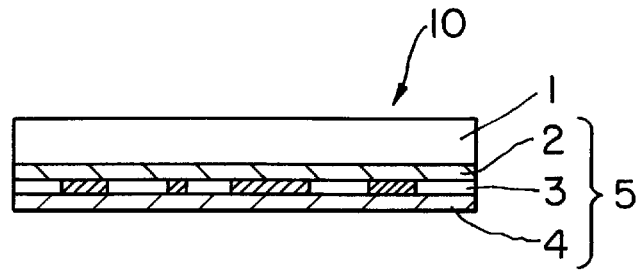
FIG. 1 is a cross-sectional view showing one embodiment of the transfer sheet according to the present invention.

FIG. 1 is a cross-sectional view showing one embodiment of the transfer sheet for provision of a pattern on a three-dimensional object according to the present invention. The transfer sheet 10, for provision of a pattern on a three-dimensional object according to the present invention, shown in the drawing comprises: an olefinic thermoplastic elastomer film as a substrate 1; and, provided on the substrate in the following order, a release layer 2, a pattern layer 3, and an adhesive layer 4. In this case, the release layer 2, the pattern layer 3, and the adhesive layer 4 constitute a transfer layer 5.

In general, the transfer layer 5 is constituted by the release layer 2, the pattern layer 3, and the adhesive layer 4. The layer construction of the transfer sheet for provision of a pattern on a three-dimensional object according to the present invention is not limited to this construction only, and various forms of the layer construction are possible. For example, when the pattern layer 3 has adhesion to the object or when the adhesive layer 4 is previously provided by coating on the object, the adhesive layer 4 may be omitted. Further, when the pattern layer 3 has suitable releasability from the substrate 1 and when a function as a surface protective layer after the transfer need not rely upon the release layer 2, the release layer 2 may be omitted. Further, when these both conditions are met according to applications and specifications, the transfer layer 5 may consist of a pattern layer 3 alone.

An olefinic thermoplastic elastomer film is used to constitute the substrate 1. Olefinic thermoplastic elastomers usable herein include, for example:

(1) a soft polypropylene, described in Japanese Patent Publication No. 23278/1994, comprising a mixture of (A) 10 to 90% by weight of an atactic polypropylene, as a soft segment, having a number average molecular weight Mn of not less than 25,000 and a ratio of the weight average molecular weight Mw to the number average molecular weight Mn, i.e., Mw/Mn, of 7 or less, and soluble in boiling heptane with (B) 90 to 10% by weight of an isotactic polypropylene, as a hard segment, having a melt index of 0.1 to 4 g/10 min and insoluble in boiling heptane;

(2) an olefinic elastomer, as described in Japanese Patent Publication No. 21021/1978, prepared by homogeneously blending (A) an olefin polymer (a crystalline polymer) as a hard segment, such as polyethylene, polypropylene, or polymethylpentene, with (B) a monoolefin copolymer rubber, as a soft segment, such as a partially crosslinked ethylene/propylene copolymer rubber or an unsaturated ethylene/propylene/nonconjugated diene terpolymer rubber (monoolefin rubber/olefin polymer weight ratio=50/50 to 90/10);

(3) an olefinic elastomer, as described in Japanese Patent Publication No. 34210/1978, prepared by mixing (B) an uncrosslinked monoolefin copolymer rubber (a soft segment) with (A) an olefinic copolymer (a crystalline, hard segment) and a crosslinking agent and dynamically performing partial crosslinking while heating and applying shear stress (monoolefin rubber (B)/olefinic copolymer (A) weight ratio=60/40 to 80/20);

(4) an olefinic elastomer, as described in Japanese Patent Publication No. 15741/1981, prepared by mixing (A) a peroxide-decomposable olefin polymer (a hard segment), which, when mixed with a peroxide followed by heating, causes a reduction in molecular weight resulting in increased fluidity, such as isotactic polypropylene, propylene/ethylene copolymer, or propylene/butene-1 copolymer, with (B) a peroxide-crosslinkable monoolefin copolymer rubber (a soft segment), which, when mixed with a peroxide followed by heating, causes crosslinking resulting in decreased fluidity, such as an ethylene/propylene copolymer rubber or an ethylene/propylene/nonconjugated diene terpolymer rubber, (C) a peroxide-noncrosslinkable hydrocarbon rubber (a component serving both as a soft segment and a fluidity modifier) which, when mixed with a peroxide followed by heating, causes no crosslinking and can maintain the fluidity without change, such as polyisobutylene or butyl rubber, and (D) a mineral oil softener, such as a paraffin, naphthene, or aromatic softener, and dynamically heat-treating the mixture in the presence of an organic peroxide ((A)=90 to 40 parts by weight, (B)=10 to 60 parts by weight, (A)+(B)=100 parts by weight, (C) and/or (D)=5 to 100 parts by weight)

(5) An olefinic thermoplastic elastomer, as described in Japanese Patent Laid-Open No. 139232/1990, comprising an ethylene/styrene/butylene copolymer;

(6) The above olefinic thermoplastic elastomers (1) to (5) with a hydroxyl group and/or a carboxyl group being introduced therein as a polar group, for example, olefinic thermoplastic elastomers with a hydroxyl group being introduced therein by graft polymerization of ethylene/vinyl alcohol copolymer, and olefinic thermoplastic elastomers with a carboxyl group being introduced therein by a copolymer of maleic acid, fumaric acid, itaconic acid or the like. Either or both of the hydroxyl and carboxyl groups may be used, and these polar groups function to regulate the adhesion between the substrate film and the release layer constituting the transfer layer.

The above olefinic thermoplastic elastomer may be formed by the conventional calendering, inflation, T-die extrusion or other film forming method into a film. The thickness of the film used is about 20 to 500 μm although it may vary depending upon the forming method used in the transfer of a pattern. The film may be any of stretched and unstretched films. However, use of an unstretched film is preferred from the viewpoint of formability to a shape conforming to the shape of a three-dimensional object.

Provision of the following release layer, introduction of a polar group into the olefinic thermoplastic elastomer used as the substrate, and corona treatment and plasma treatment of the substrate may be performed to regulate the adhesion between the substrate and the transfer layer.

Among these olefinic thermoplastic elastomers, those which are less likely to create the so-called "necking" and is suitable for transfer onto the surface of a three-dimensional object by taking advantage of heat and pressure comprise a mixture of an isotactic polypropylene with an atactic polypropylene, the proportion of the atactic polypropylene in the mixture being 5 to 50% by weight. Olefinic thermoplastic elastomers described in Japanese Patent Publication No. 23278/1994 are particularly preferred.

The polypropylene-based olefinic thermoplastic elastomer per se is already known in the art. In the case of the conventional polypropylene-based olefinic thermoplastic elastomer for use in packaging containers, the proportion of the atactic polypropylene as the soft segment is mainly less than 5% by weight from the viewpoint of ensuring the strength.

As described above, however, when this olefinic thermoplastic elastomer is applied to a novel application, i.e., a substrate for a transfer sheet for provision of a pattern onto a three-dimensional object or an object having irregularities as in the present invention, necking is created making it impossible to satisfactorily transfer a pattern onto the object.

Accordingly, the present inventor has made various studies and, as a result, have found that, contrary to the conventional composition design, when the proportion of the atactic polypropylene in the polypropylene-based olefinic thermoplastic elastomer is brought to not less than 5% by weight, problems such as uneven film distortion derived from necking created in the transfer of a pattern onto a three-dimensional object or an object having irregularities and consequent cockling and distortion of the pattern can be solved. A proportion by weight of atactic polypropylene of not less than 20% by weight can offer particularly good results.

When the proportion by weight of the atactic polypropylene is excessively high, the substrate film per se is likely to deform. Consequently, when the transfer sheet is passed through a printer, the substrate film is deformed posing problems of distorted pattern, poor registration in the case of multi-color printing and the like. Further, breaking is likely to occur during forming to a shape conforming to the shape of the three-dimensional object.

When the transfer layer is printed using a conventional rotary press, such as rotogravure printing machine, or when conventional transfer methods (methods described in the present specification) are used, the upper limit of the proportion by weight of the atactic polypropylene is preferably 50% by weight, more preferably 40% by weight.

The olefinic thermoplastic elastomer should have formability to a shape conforming to the shape of the three-dimensional object and mechanical strength comparable with the conventional semi-rigid (plasticizer content: 10 to 30 phr in terms of dioctyl phthalate) vinyl chloride resin. For this reason, those having a breaking strength at 25° C. of 300 to 400 kg/cm$^2$, an elongation at break at 25° C. of 150 to 180%, a breaking strength at 70° C. of 200 to 300 kg/cm$^2$, an elongation at break at 70° C. of 160 to 200° C. are selected. The above measurements are those measured according to the procedure set forth in JIS-K-6734. When the breaking strength at 25° C. exceeds the above upper limit value or when the elongation at break at 25° C. is below the above lower limit value, the thermoformability at room temperature to a shape conforming to the shape of the three-dimensional object is unsatisfactory. When the breaking strength at 70° C. exceeds the above upper limit value or when the elongation at break at 70° C. is below the above lower limit value, the thermoformability (usually at about 70 to 150° C.) to a shape conforming to the shape of the three-dimensional object is unsatisfactory. On the other hand, when the breaking strength at 25° C. is below the above lower limit value, the transfer sheet is likely to break at the time of forming at room temperature into a shape conforming to the shape of the three-dimensional object. When the elongation at 25° C. exceeds the above upper limit value, the registration accuracy in the case of multi-color printing is unsatisfactory. When the breaking strength at 70° C. is below the above lower limit value or when the elongation at break at 70° C. exceeds the above upper limit value, distortion of the pattern at the time of forming into a shape conforming to the shape of the three-dimensional object is significant.

The release layer 2 is optionally provided as a part of the transfer layer. Upon transfer operation, it is transferred onto the object and functions as a protective layer which protects the surface of the object against chemicals, ultraviolet light, abrasion and the like. Further, the release layer functions to regulate the adhesion of the transfer layer to the substrate, rendering the releasability of the substrate suitable.

Preferably, the resin for constituting the release layer can provide suitable releasability and, at the same time, elongation high enough to be formed into a shape confirming to the shape of the three-dimensional object. Examples of resins usable for this purpose include polyvinyl butyral resin, cellulosic resins, such as nitrocellulose, chlorinated polypropylene resin, acrylic resin, vinyl chloride/vinyl acetate copolymer, polyamide resin, and urethane resin. In particular, in the transfer sheet according to the present invention, since an olefinic thermoplastic elastomer is used as the substrate, resins usable for the release layer are not advantageously limited, unlike the conventional transfer sheet using vinyl chloride resin, polyethylene, polypropylene or the like. Specifically, there is no particular need to use the above-described polyvinylbutyral, cellulose acetate propionate resin, chlorinated polypropylene resin and other resins, used in the prior art, which have poor solvent resistance and, when used as the surface protective layer, have unsatisfactory chemical resistance, and urethane resins and other resins having excellent solvent resistance can be used.

Thus, the resin for the release layer which, after transfer, functions as a surface layer of the three-dimensional object, is not particularly limited, making it possible to more freely design the surface properties of the three-dimensional object with a pattern, such as solvent resistance, scratch resistance, and abrasion resistance. Further, since the above excellent surface properties can be imparted, the release layer after transfer can be used as finish coating. The thickness of the release layer is 0.5 to 30 μm, usually about 2 to 10 μm.

The surface protective layer in the three-dimensional object with a pattern provided thereon by transfer may be formed by spray coating or the like after the transfer of the transfer layer.

Either or both of an ultraviolet absorber and a light stabilizer may be added to the release layer from the viewpoint of further improving the weather resistance (lightfastness) For each of the ultraviolet absorber and the light stabilizer, the amount thereof added is usually about 0.5 to 10% by weight. In general, combined use of the ultraviolet absorber and the light stabilizer is preferred. When the amount of these additives added is smaller than 0.5% by weight, the effect of improving the weather resistance is not satisfactory. On the other hand, when it exceeds 10% by weight, coloration occurs and the effect is saturated.

Ultraviolet absorbers usable herein include organic ultraviolet absorbers, such as benzotriazole, benzophenone, and salicylic acid ultraviolet absorbers and, in addition, inorganic ultraviolet absorbers, such as particulate zinc oxide, cerium oxide, and titanium oxide having a particle diameter of not more than 0.2 $\mu$m. Light absorbers usable herein include hindered amine radical scavengers, such as bis-(2, 2,2,6,6-tetramethyl-4-piperidyl) sebacate.

The pattern layer 3 may be formed by printing or coating a pattern, such as a design, or a solid print or coat using an ink or a coating liquid prepared by mixing a conventional vehicle with a pigment or the like. Printing may be performed by a conventional printing method, such as gravure printing, offset printing, relief printing, flexo printing, or silk screen printing. A solid coat or print may be prepared by a conventional coating method, such as gravure coating or gravure reverse coating.

Various printing inks or coating liquids may be used for the pattern layer. A composition comprising a binder resin, a colorant, a solvent and, if necessary, an extender pigment, a curing agent, and various additives. Binder resins usable herein include conventional binder resins, for example, thermoplastic resins, such as acrylic resin, chlorinated polyethylene, chlorinated polypropylene, vinyl acetate, vinyl chloride/vinyl acetate copolymer, and cellulosic resins, cold or thermosetting resins, such as polyurethane, and ionic radiation curable resins, such as acrylic resins. According to the transfer sheet for provision of a pattern on a three-dimensional object of the present invention, since an olefinic thermoplastic elastomer is used in the substrate, a wider range of binder resins than those in the case of the conventional substrate using a film of a vinyl chloride resin, polyethylene or polypropylene even when the pattern layer is provided directly on the substrate. When the pattern layer is provided on the release layer, the range of usable binder resins becomes wider.

Colorants usable herein include conventional color pigments, for example, inorganic pigments, such as titanium white, zinc flower, iron oxide red, vermillion, ultramarine blue, cobalt blue, titanium yellow, chrome yellow, and carbon black, organic pigments (including dyes), such as isoindolinone, Hansa yellow A, quinacridone, Premanent red 4R, Phthalocyanine blue, Indanthrene blue RS, and aniline black, metallic pigments, such as aluminum and brass, and pearl pigments comprising a foil powder of titanium dioxide-coated mica, basic lead carbonate or the like.

Extender pigments usable herein include calcium carbonate, silica, alumina, and barium sulfate. Further, the pigment may be used in the form of a mixture with ultraviolet absorbers and/or light absorbers described above in connection with the release layer.

Patterns in the pattern layer usable herein include, for example, woodgrain patterns, rift patterns, texture patterns, grain leather patterns, letters, geometrical figures, symbols, line drawings, various abstract patterns, solid prints or coat, or combinations thereof.

The pattern layer 3 may be formed by laminating the whole surface or a part of the surface in a pattern form a thin metal layer. This thin metal layer may be formed using a metal, such as aluminum, chromium, gold, silver, or copper by vacuum deposition, sputtering or the like. The formation of the layer in a pattern form may be performed by a conventional method, for example, by providing a removable layer of a water-soluble ink in a desired pattern form in an area, where the metallic thin layer is unnecessary, forming a metallic thin layer on the whole surface by vapor deposition or the like, and conducting washing with water to remove the removable layer and the metallic thin layer in its area overlying the removable layer. The pattern layer may be constituted by a combination of the printed layer with this metallic thin layer.

When the pattern layer 3 has adhesion to the object or when the adhesive layer is previously provided by coating on the object, the adhesive layer 4 may be omitted. However, the adhesive layer on the object side and the adhesive layer 4 on the transfer sheet side may be used in combination. The resin for the adhesive layer 4 should be, of course, selected by taking into consideration the adhesion to the object.

The object used with the transfer sheet for provision of a pattern on a three-dimensional object according to the present invention will be described. The material and the shape of the object is not particularly limited. Examples of materials usable herein include resins, such as acrylic resin , vinyl chloride resin, acrylonitrile/butadiene/styrene copolymer (ABS resin), polycarbonate resin, polyethylene, polypropylene, and phenolic resin, metal and metallic compounds, such as aluminum, iron, stainless steel, and brass, woods, such as plywoods, wood boards, medium-density fiber boards (MDF), glass, ceramics, such as potteries and tiles, cements, such as ALC (lightweight cellular concrete), GRC (fiber-reinforced concrete), calcium silicate, and asbestos cement corrugated sheets. Examples of shapes usable herein include extrudats, injection molded products, press molded products, flat sheets, curved sheets, and rods of resins. In the case of the injection molding/pattern transfer method, the shape of the object is created simultaneously with the transfer. In the present invention, the term "object" is used to connote molded products of resins and, in addition, articles prepared by cutting of MDF to a three-dimensional shape.

For the adhesive layer which functions to transfer and adhere the transfer layer of the transfer sheet onto the above object, a suitable one may be selected depending upon the material of the object. For example, an acrylic resin is one of preferred resins. This is because the acrylic resin permits the adhesion to the object to be easily regulated depending upon the material of the object by copolymerizing various acrylic esters and methacrylic esters and other vinyl monomers. For example, when the object is made of an ABS resin, the acrylic resin is a preferred resin.

Further, when the object is made of a vinyl chloride resin, use of the acrylic resin in the form of a mixture with a suitable other resin(s) depending upon the material of the object, for example, a vinyl chloride/vinyl acetate copolymer often offers better adhesion.

The adhesion of the adhesive layer may be developed through any mechanism. Specifically, the adhesive may be of heat sensitive type which create the adhesion upon heating, of pressure sensitive type, solvent activation type or the like. When the adhesive is of pressure sensitive type, the construction of the transfer sheet is generally such that a release paper or a release film is laminated on the adhesive layer to protect the adhesive layer. In this case, immediately before the transfer, the release paper or release film is removed. The thickness of the adhesive layer is usually about 1 to 50 μm.

As described above, in the transfer sheet for provision of a pattern on a three-dimensional object, in some cases, the adhesive layer is not provided in the transfer sheet, and, instead, the adhesive is applied on the transfer sheet side and/or the object side before transfer of the transfer sheet. When the adhesive layer is present in the transfer sheet and the adhesive is applied on the object, the adhesion of the transfer layer can be further improved. In the injection molding/pattern transfer or the like, when a liquid resin is solidified to form a three dimensional object with the transfer layer transferred thereon, the liquid resin per se often functions as an adhesive.

When a pattern is provided on an object by using the transfer sheet for provision of a pattern on a three-dimensional object according to the present invention, conventional methods using pressure may be applied. Further, if necessary, heat may be utilized. In particular, when a pattern is transferred on an object having irregular surface, combined use of heat and pressure is preferred. For example, the following various transfer methods may be used.

(1) The so-called "injection molding/pattern transfer method," as described in Japanese Patent Laid-Open No. 315950/1994, wherein after the transfer sheet is disposed between a female mold and a male mold for injection molding, a molten resin is injected and filled into a cavity defined by both the molds to perform molding of a resin simultaneously with the transfer of the transfer layer onto the surface of the molded product.

(2) A transfer method utilizing the so-called "vacuum molding lamination method," as described in Japanese Patent Publication Nos. 45768/1981 (overlay method) and 58014/1985 (vacuum pressing method), wherein the transfer sheet is allowed to face or is disposed on the surface of a three-dimensional object, such as a molded product, if necessary, through an adhesive and vacuum suction is performed from the object side to create a difference in atmospheric pressure between the substrate film side and the object side to press the transfer layer of the transfer sheet against the three-dimensional object, thereby transferring the transfer layer onto the surface of the three-dimensional object.

(3) A transfer method using the so-called "wrapping," as described in Japanese Patent Publication Nos. 5895/1986 and 2666/1991, wherein the transfer sheet is fed in the direction of the major axis of a columnar substrate, such as a cylindrical or prism substrate, if necessary, through an adhesive layer, while press bonding the transfer layer successively on a plurality of side faces constituting the columnar substrate by means of a plurality of rollers facing different directions.

(4) The so-called "roller transfer method," as described in Japanese Patent Publication No. 59876/1985 and Japanese Patent Laid-Open No. 139097/1993, which comprises the steps of: disposing the transfer sheet on an object so that the transfer layer faces the object; pressing the transfer sheet from the substrate film side by means of an elastic roller to bring the transfer layer into contact with the object; and removing the substrate film alone (FIG. 4). The roller used is generally one wherein the periphery of the surface of a rotary shaft core made of a rigid body, such as iron, is covered with a soft elastic material. Elastic materials usable herein include rubbers, such as silicone rubber, fluororubber, natural rubber, and butadiene rubber. Silicone rubber is particularly preferred from the viewpoint of heat resistance and elasticity.

In particular, when the surface (surface on which a pattern is to be transferred) of the object has irregularities (three-dimensional shape), use of an elastic material having a rubber hardness of not more than 60° as measured according to the procedure as set forth in JIS (Japanese Industrial Standards) is preferred from the viewpoint of permitting the transfer sheet to be formed into a shape conforming to the shape of the irregular surface.

The diameter of the elastic roller is generally about 5 to 20 cm.

(5) A novel transfer method which is useful particularly when the transfer layer is transferred onto an irregular surface. Specifically, as shown in FIG. 5, this method comprises: disposing the transfer sheet on an object so that the transfer layer faces the object; and allowing solid particles to collide against the transfer sheet from the substrate film side to create an impact force by which the transfer layer is formed into a shape confirming to the shape of the surface of the object and, at the same time, adhered onto the surface of the object; and removing the substrate film alone.

(6) Other methods including BMC (bulk molding compound) molding, SMC (sheet molding compound) molding, various molding methods in FRP (fiber reinforced plastics), such as hand lay-up molding, RIM (Reaction Injection Molding), and matched-mold forming.

For the methods (1) and (6), transfer is performed simultaneously with the development of a three-dimensional shape in the three-dimensional object. On the other hand, for the methods (2), (3), (4), and (5), transfer is performed on an object which already has a three-dimensional shape. Further, in the method (1), it is also possible to use a technique wherein, after the transfer sheet is preformed using the mold for the resin or a different mold, the resin is injection molded to conduct transfer of the transfer layer simultaneously with the molding. Similarly, in the method (6), the forming of the transfer sheet into a three-dimensional shape may be performed simultaneously with the molding or previously performed before molding. In the hand lay-up method, the transfer sheet is preformed.

Among the above various methods, the method (2) (vacuum press method), the method (1) (injection molding/pattern transfer method), and the method (5) (method utilizing solid particle impact force) will be described.

Figure 2:
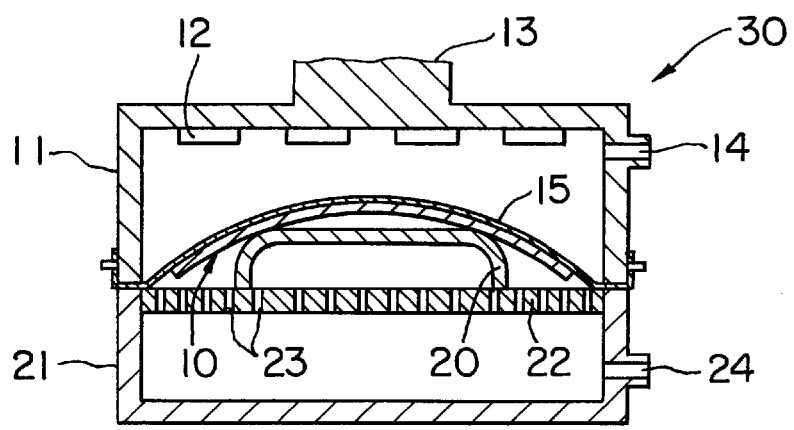
FIG. 2 is an explanatory diagram showing a vacuum press transfer method which is an embodiment of the transfer method for transferring a pattern onto a three-dimensional object using the transfer sheet according to the present invention.

FIG. 2 is an explanatory diagram showing a vacuum press method among the transfer methods using the vacuum molding lamination (method (2)) Although the vacuum press method is similar to the vacuum lamination method, is somewhat different from the vacuum lamination method in that, in addition to air pressure, compression pressure created by the rubbery elastic film is utilized for press contacting the transfer sheet with the object and that heating of the transfer sheet is performed through the rubbery elastic film heated by a heater. The vacuum press method is characterized by homogeneous heating of the transfer sheet, stronger press contacting force and the like.

The vacuum press 30 schematically shown in FIG. 2 has an upper chamber 11 which is vertically movable by vertically moving means 13, such as a hydraulic cylinder. A lower chamber 21 is provided below the upper chamber so as to face the upper chamber 11. A heater 12 is disposed in the interior of the upper chamber 11. A lower opening of the upper chamber 11 is entirely covered with a rubbery elastic film 15. The rubbery elastic film 15 is generally made of a silicone rubber. The upper face of the lower chamber 21 is in the form of a table 22 provided with a plurality of exhaust ports 23. The upper chamber 11 and the lower chamber 21 are provided with supply and exhaust ports 14, 24 which permit the internal pressure of the upper chamber and the internal pressure of the lower chamber to be regulated independently of each other.

In the vacuum press method, at the outset, the upper chamber 11 is moved upward, and an object 20 is disposed on the table 22 in such a state that the upper chamber 11 is separate from the lower chamber 21. A transfer sheet 10 for provision of a pattern on a three-dimensional object is then disposed on the object 20 so that the transfer layer of the transfer sheet 10 faces the object 20. When the adhesive is applied on the outer surface of the transfer sheet or the object, it may be applied in this stage. Further, when the adhesive contains a solvent, the solvent is removed in this stage.

Subsequently, the upper chamber 11 is moved downward and brought into press contact with the lower chamber 21 to close the upper chamber 11 and the lower chamber 21. This state is shown in FIG. 2. The interior of the lower chamber 21 is then evacuated to render the pressure of the upper chamber 11 higher that of the lower chamber 21. Further, the transfer sheet 10 is heat-softened through the rubbery elastic film 15 by means of a heater 12 and, thus, is made formable. As a result, the transfer sheet 10 is deformed along the outer surface of the object 20 and press contacted by taking advantage of a difference in pressure between the upper chamber 11 and the lower chamber 21 and a pressure created by the contraction of the rubbery elastic film 15 and comes into intimate contact with the object 20.

Finally, the reduced pressure of the lower chamber 21 is released, and the applied pressure of the upper chamber 11 is released to return the pressure of both the chambers to atmospheric pressure, The upper chamber 11 is then moved upward and separated from the lower chamber 21. The object 20 with the transfer sheet 10 being applied thereto is taken out, and the substrate 1 of the transfer sheet 10 is removed to prepare a three-dimensional object with a pattern provided thereon by transfer of the transfer layer.

Figure 3:
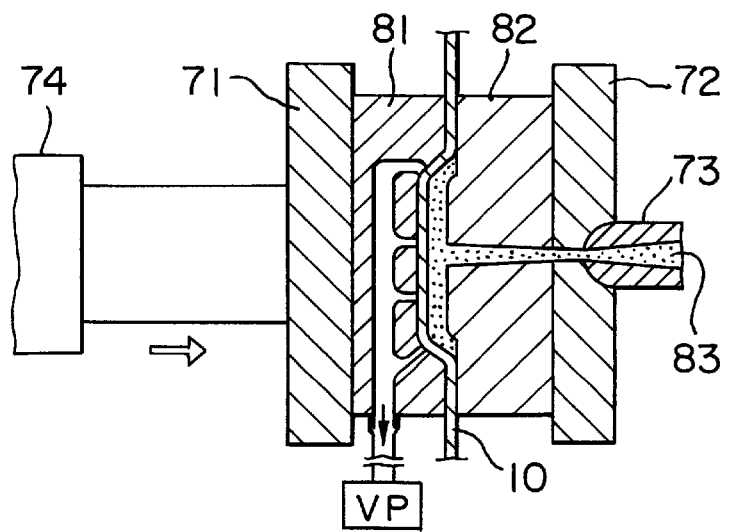
FIG. 3 is an explanatory diagram showing an injection molding/pattern transfer method which is another embodiment of the transfer method for transferring a pattern onto a three-dimensional object using the transfer sheet according to the present invention.

FIG. 3 is an explanatory diagram showing the injection molding/pattern transfer method. In FIG. 3, the system is in such a state that the resin is already injected into a cavity and the transfer sheet 10 is formed and intimately contacted with the resin. A female mold 81 provided with a concave cavity is fixed to a movable die plate (a movable plate) 71, and a male mold 82 provided with an injection hole is fixed to another die plate (a fixed plate) 72, and a nozzle 73 is positioned on the back face of the fixed plate 72. The die plate 71 is horizontally moved, as viewed in the drawing, by a hydraulic cylinder 74 provided on the back face of the die plate 71 to bring the female mold 81 and the male mold 82 into press contact with each other, thereby conducting mold clamping. The transfer sheet 10 is inserted between the female mold 81 and the male mold 82. A suction hole connected through a suction pipe to a vacuum pump VP is formed in the cavity face of the female mold 81. Before the mold clamping, the transfer sheet 10 is heat-softened by means of a heating plate (not shown) by utilizing the cavity face of the female mold 81 to conduct preliminary vacuum forming. After removal of the heating plate, mold clamping is performed, and a molten resin 83 is injected and filled into the cavity (molding cavity) through a nozzle 73, followed by cooling to solidify the resin. Thereafter, mold opening is performed. The substrate of the transfer sheet 10 is separated from the product. Thus, a three-dimensional object with a pattern provided by the transfer of the transfer layer is prepared.

Next, the method utilizing the solid particle impact force will be described.

Solid particles

Solid particles P usable herein include, nonmetallic, inorganic particles which are inorganic powders, such as glass beads, ceramic beads, calcium carbonate beads, alumina beads, zirconia beads, alundum beads, and corundum beads; metallic particles, for example, beads of iron, iron alloys, such as carbon steel and stainless steel, aluminum, aluminum alloy, such as duralumin, titanium, zinc and the like; and organic particles, for example, resin beads, such as fluororesin beads, nylon beads, silicone resin beads, urethane resin beads, urea resin beads, phenolic resin beads, and crosslinked rubber beads. When liquid water is used as an accelerating fluid of solid particles, use of nonmetallic beads, such as stainless beads, glass beads, ceramic beads, and resin beads, is preferred because they are not rusted by water. The shape of the particles is preferably spherical. However, ellipsoid of revolution, polyhedron, scale, amorphous shape and other shapes may be used. The particle diameter of the solid particles is usually about 10 to 1000 $\mu$m. The solid particles may be used also as heating or cooling means. Use of heated solid particles permits heat activation of the adhesive and acceleration of crosslinking curing, or an improvement in stretchability by heating of the transfer sheet to be attained simultaneously with by depressing of the transfer sheet. In this case, before the application of impact force by collision of solid particles, the transfer sheet and the object may be heated to some extent by other heating method. Further, solid particles having a temperature below the temperature of the adhesive at the time of bonding may be used as cooling solid particles from the viewpoint of accelerating cooling after the bonding. Furthermore, a part or the whole of the solid particles may be used as heating solid particles or cooling solid particles. Furthermore, collision of heating solid particles may be followed by collision of cooling solid particles. Furthermore, it is also possible to use a method wherein the transfer sheet, the object, the adhesive and the like which should be heated are sufficiently preheated by other heating method and, in this state, cooling solid particles are used to substantially simultaneously conduct forming, bonding and cooling of the transfer sheet.

The solid particles may be cooled or heated as follows. When the solid particles are stored in a tank, such as a hopper, heating or cooling may be performed by heating or cooling means, utilizing an electric heater, a heated vapor, or a coolant, provided within or on the outer wall of the tank. Alternatively, these means may be provided on the outer wall of a solid particle transport pipe to conduct heating or cooling by the transport pipe. Further, when a fluid is used for accelerating the solid particles, a cooled or heated fluid may be used to cool or heat the solid particles by taking advantage of heat conduction from the fluid. In this case, when the fluid is allowed to collide against the transfer sheet, the fluid, together with the solid particles, can function as heating or cooling means. Furthermore, when the fluid is a liquid and the solid particles, together with the liquid, are stored in a tank, the solid particles and the liquid may be cooled or heated during the storage.

Application of impact force by collision of solid particles

When the solid particles are allowed to collide against the transfer sheet to depress the transfer sheet against the object, the solid particles are blown from solid particle blow-off means, for blowing off the solid particle, toward the transfer sheet to apply impact force to the transfer sheet. A blow-off device using a rotary vane wheel as a particle accelerator and a blow-off device using a blow nozzle may be used as the solid particle blow-off means. In the case of the blow-off device using a vane wheel, the rotation of the vane wheel permits the solid particles to be accelerated and blown off. On the other hand, in the case of the blow-off device using a blow nozzle, a solid particle accelerating fluid is used to accelerate and carry the solid particles using a high-speed fluid stream and to blow off the solid particles together with the fluid. The vane wheel and the blow nozzle may be those commonly used in the field of blasting, such as sandblasting, shot blasting, and shot peening. For example, a centrifugal blaster may be used for the vane wheel, and a pressure or suction type blaster or a wet blaster may be used for the blow nozzle. In the case of the centrifugal blaster, the solid particles are accelerated and blown off by the rotational force created by the vane wheel. On the other hand, in the case of the pressure type blaster, the solid particles are previously mixed with compressed air and, together with the air, are blown off. In the case of the suction type blaster, the solid particles are introduced by suction into a negative pressure section created by a high-speed stream of the compressed air and are blown off together with the air. In the case of the wet blaster, the solid particles are mixed with a liquid, and the mixture is blown off.

Besides the blow nozzle and the vane wheel, other methods, for example, a method wherein the solid particle are accelerated utilizing free-fall drop by gravity and a method wherein magnetic particles are accelerated by magnetic field, may be used for blowing off the solid particle. In the case of the solid particle blow-off means using the vane wheel, the gravity, or the magnetic field, it is also possible to blow off the solid particles in vacuo toward the transfer sheet.

FIGS. 6 to 9 are conceptual diagrams of one embodiment of a vane wheel usable as a particle accelerator in a blow-off device. This device corresponds to a centrifugal blaster used in the field of blasting.

The vane wheel 812 shown in the drawings has a plurality of vanes 813 both sides of which are fixed by a side plate 814, and a rotational center portion is not provided with the vane 813 and constitutes a hollow section 815. Further, a directional controller 816 is provided inside the hollow section 815. The directional controller 816 has an opening 817 with a part of the outer periphery thereof being open in the circumferential direction and is in a hollow cylindrical form, and the rotating shaft center of the directional controller 816 is the same as that of the vane wheel 812. The directional controller 816 is rotatable independently of the vane wheel. In use of the vane wheel, the opening is fixed in a suitable direction. Another vane wheel, which has a hollow interior and the same rotating shaft center as the vane wheel 812, is provided, as a spreader 818, inside the directional controller (see FIG. 8). The spreader 818 is rotated together with the outer vane wheel 812. A rotating shaft 819 is fixed to the rotational center of the side plate 814, rotatably supported by a bearing 820, and driven and rotated by means of a rotating power source (not shown), such as a motor, to rotate the vane wheel 812. The rotating shaft 819 is not passed through the two side plates 814 with the vane 813 being provided therebetween to form a space with no shaft.

Solid particles P are fed from a hopper or the like through a transport pipe into the spreader 818. In general, the solid particles are fed from above (just above or the upper right or left) the vane wheel. The solid particles fed into the spreader are scattered by the vane wheel of the spreader toward the outside of the vane wheel. The scattered solid particles are spouted in a direction permitted by the opening 817 of the directional controller 816 and fed between the vane 813 and the vane 813 of the outer vane wheel 812. They are then allowed to collide against the vane 813, accelerated by the rotational force of the vane wheel 812, and spouted from the vane wheel.

Figure 6:
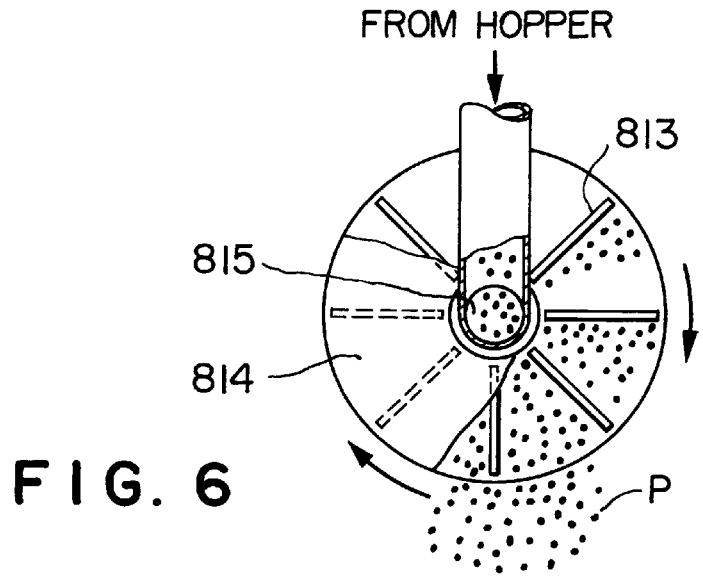
FIGS. 6 and 7 are diagrams showing an embodiment of a blow-off device using a vane wheel.
Figure 7:
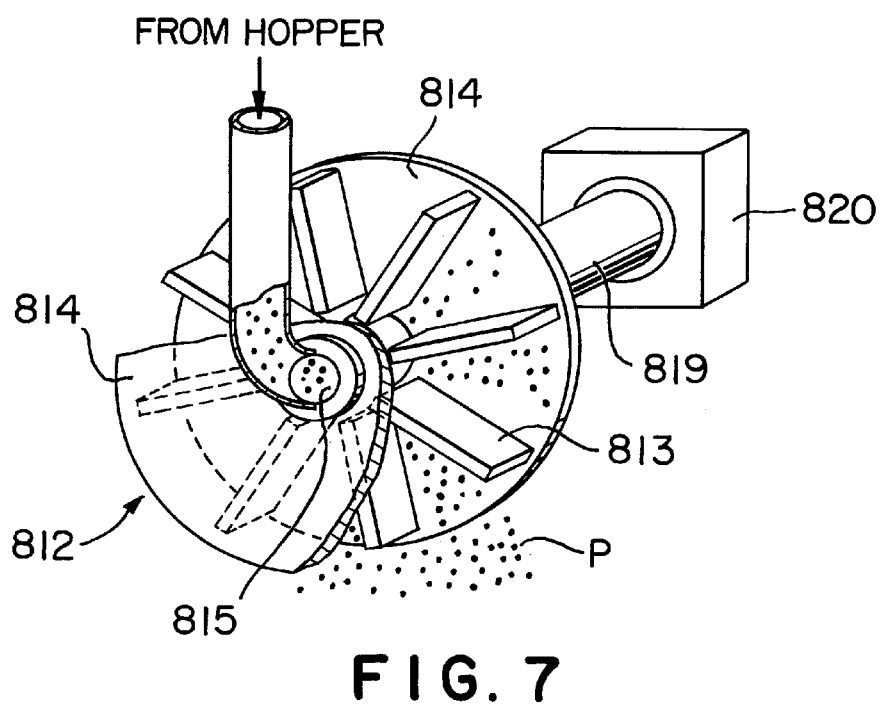
Figure 8:
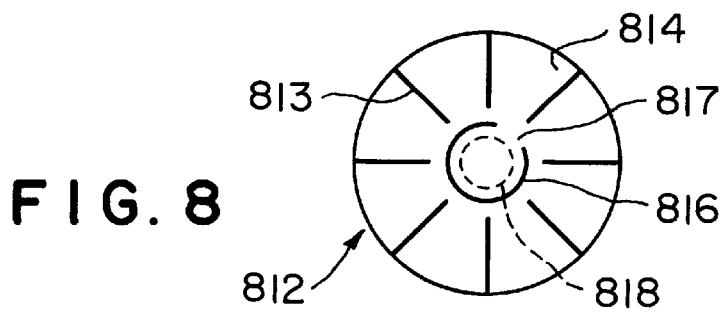
FIGS. 8 and FIGS. 9 (A) and (B) are conceptual diagrams illustrating the interior of the vane wheel shown in FIGS. 6 and 7.
Figure 9:
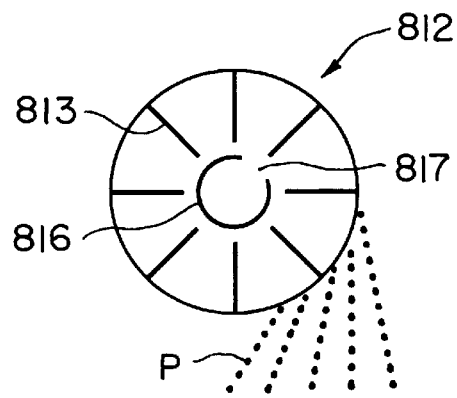
Figure 9:
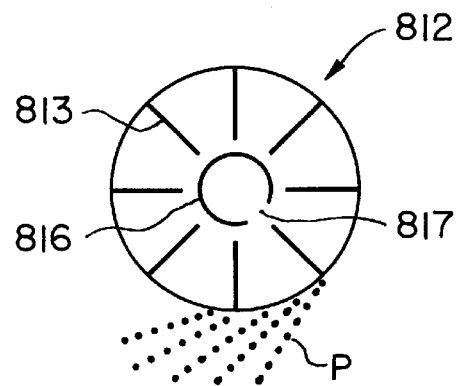

The direction in which the solid particles are spouted is substantially vertically below the vane wheel as shown in FIG. 6 and 7. It, however, may be a horizontal direction or a lower right or left direction (not shown). FIGS. 9(A) and 9(B) are conceptual diagrams of a directional controller which regulates the spout direction of the solid particles by setting the direction of the opening 817 of the directional controller 816. In FIGS. 9(A) and 9(B), the directional controllers are fixed in respective positions shown in the drawings. In the directional controller 816, the amount of the solid particles spouted may be regulated also by regulating the size of the opening in the circumferential direction or the widthwise direction thereof.

In FIG. 7, the rotating shaft 819 is provided on the outside of the side plate 814 and does not reach the hollow section 815. According to another embodiment, a rotating shaft, which is thinner than the diameter of the hollow section may be allowed to reach the hollow section. According to still another embodiment, the inside per se of a cylindrical rotating shaft provided with an opening, for allowing the solid particles to pass therethrough, being provided, is hollow (not shown).

The shape of the vane 813 is typically a rectangular flat plate (a rectangular parallelopiped) as shown in FIGS. 6 to 9. Besides this shape, a curved face plate and a propeller, such as screw propeller, may be used. The shape may be selected depending upon applications and purposes. The number of vanes is usually selected from 2 to 10.

The spout (blow-off) direction, spout speed, projection density, spouting diffusion angle, and the like of the accelerated particles are regulated by varying the shape, number of vanes, and rotating speed of the vane wheel, the mass, feed rate, and feed direction of the solid particles, and the size and direction of the opening of the directional controller.

Figure 10:
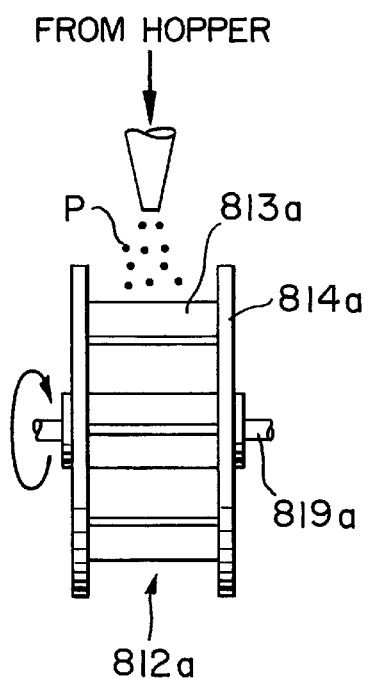
FIGS. 10 (A) and (B) are diagrams showing another embodiment of the vane wheel used in a blow-off device.
Figure 10:
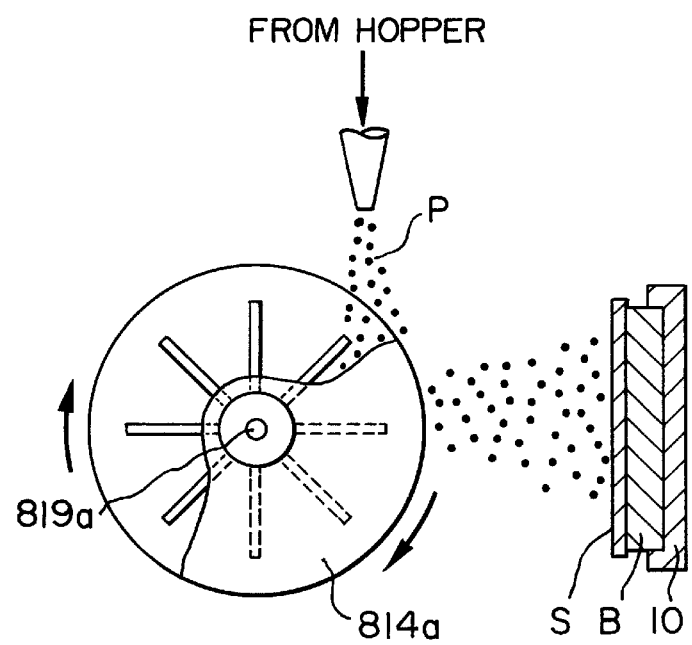

FIG. 10 is a conceptual diagram showing another embodiment of the vane wheel. In the vane wheel 812a shown in this drawing, both sides of a plurality of flat vanes 813a are fixed by two side plates 814a. In general, solid particles P are fed from above (just above or the upper right or left) the vane wheel. The side plates 814a regulate the spout direction in the widthwise direction with respect to the rotating shaft 319a. The spout (blow-off) direction, spout speed, projection density, spouting diffusion angle, and the like of the accelerated particles are regulated by varying the shape, number of vanes, and rotating speed of the vane wheel, the mass, feed rate, and feed direction of the solid particles. The spout direction of the solid particles may be substantially vertically below the vane wheel (not shown), a horizontal direction (FIG. 10), a lower right or left direction (not shown) or the like. In the side view of FIG. 10(B), a transfer sheet S is also known. Since, however, this drawing mainly aims to illustrate the vane wheel, a roller disposed along the transfer sheet for preventing the transfer sheet being lifting is not shown.

In vane wheels, such as the above vane wheels 812, 812a, if necessary, a spout (blow-off) guide (not shown), which opens only a solid particle spout portion of the vane wheel can cover the periphery of the other portion of the vane wheel, may be provided to make the spout direction of the solid particles uniform or to regulate the spout direction of the solid particles. The opening of the spout guide may be in the form of hollow column, prism, cone, polygonal cone, and fish tail. The spout guide may be provided with a single opening or has a honeycomb-like divided interior.

The dimension of vane wheels, such as the vane wheels 812, 812a, is generally such that the diameter is about 5 to 60 cm, the vane width is about 5 to 20 cm, the vane length is approximately the same as the diameter of the vane wheel, and the number of revolutions is about 500 to 5000 rpm. The spout speed of the solid particles is about 10 to 50 m/sec, and the projection density is about 10 to 150 kg/m$^2$.

The material for the vane of the vane wheel may be suitably selected from ceramics, and metals, such as steel, chromium cast steel, titanium, and titanium alloys. Since the solid particles are accelerated upon contact with the vane, the vane is preferably made of highly abrasion-resistant high chromium cast steel or ceramic.

Blow nozzle

Figure 11:
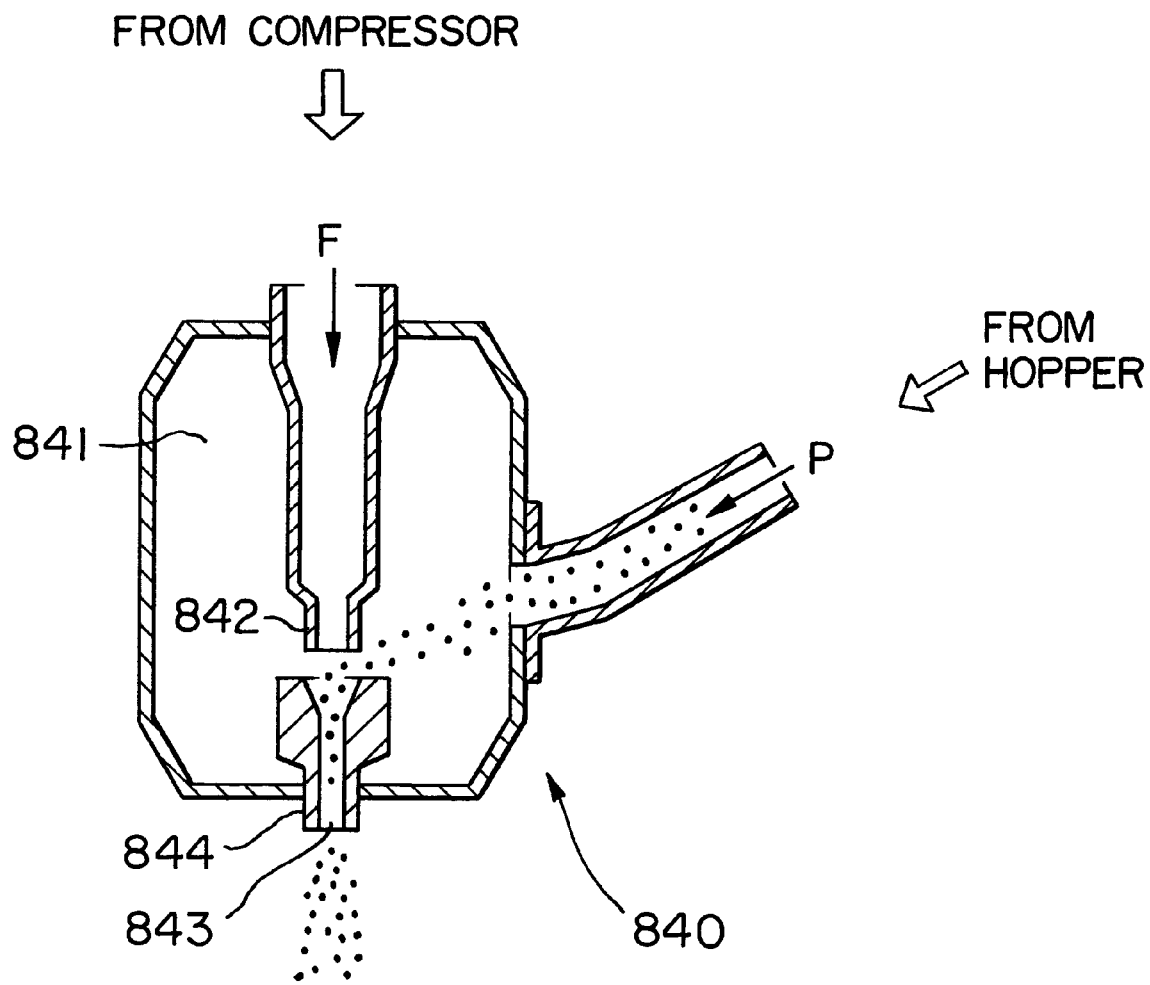
FIG. 11 is a diagram showing an embodiment of a blow-off device using a blow nozzle.

FIG. 11 is a conceptual diagram showing one example of a blow-off device 840, utilizing a blow nozzle, which is used as solid particle blow-off means for blowing off the solid particles together with a fluid. The blow-off device 840 shown in the drawing is one embodiment of the blow-off device wherein a gas is used as a solid particle accelerating fluid and, when the solid particles are blown off, is mixed with the solid particles. The blow-off device 840 shown in the drawing comprises a guide chamber 841 for mixing solid particles P with a fluid F. an internal nozzle 842 for blowing the fluid F into the guide chamber 841, and a blow nozzle section 844 for blowing off the solid particles P and the fluid F through a nozzle opening 843. The fluid F fed from a compressor or a blower (not shown), if necessary, through a pressure tank (not shown) is blown through the internal nozzle 842 into the guide chamber 841 and blown off from the guide chamber 841 through the nozzle opening 843 of the nozzle 844. In this case, a negative pressure is created by the action of a high speed fluid stream in the guide chamber 841 in the blow-off device, and, by the negative pressure, the solid particles are lead to and mixed with the fluid stream. The solid particles are accelerated and carried by the fluid stream and, together with the fluid stream, are blown off through the opening 843 of the nozzle 844.

The blow nozzle may be of such a type that a liquid is used as the solid particle accelerating fluid. When the solid particle accelerating fluid is a liquid, it is possible to use a method wherein the liquid, together with the solid particles, is stored as a mixture in a pressure tank (not shown) and the mixture is spouted, for example, by means of a pump (not shown) through the nozzle opening of the blow nozzle.

The nozzle opening may be in the form of hollow column, prism, cone, polygonal cone, fish tail or the like. The blow nozzle may be provided with a single opening or may have a honeycomb-like divided interior. The fluid pressure is generally about 0.1 to 100 kg/cm$^2$ in terms of blow pressure. The flow rate of the fluid stream is generally about 1 to 80 m/sec for the liquid stream and generally about 5 to 80 m/sec for the gas stream.

The material for the blow-off device, such as a guide chamber or a nozzle section, may be suitably selected, depending upon the type of fluid, from ceramics, steel, titanium, titanium alloys and the like. The solid particles are passed through the interior of the blow-off device and, hence, comes into contact with the inner wall of the device. Therefore, when the solid particles are metallic beads or inorganic particles, use of highly abrasion-resistant ceramics is preferred because these solid particles are rigid. On the other hand, when the fluid is a liquid, a material is selected which does not cause rust, dissolution, corrosion and other unfavorable phenomena. For example, when the fluid is water, use of stainless steel, titanium, titanium alloy, synthetic resins, and ceramics is preferred. However, steel may also be used if the surface is waterproofed.

Fluid

A fluid F is used as a solid particle accelerating fluid when the solid particles are accelerated and carried by a fluid stream and, together with the fluid, is blown off through solid particle blow-off means (such as a blow nozzle). Both a gas and a liquid may be used as the fluid. In general, however, a gas is used because it is easy to handle.

The gas is typically air. However, carbon dioxide gas, nitrogen gas and the like may also be used.

The liquid is not particularly limited. However, water is one of preferred liquids from the viewpoint of incombustibility, easy removal by evaporation, nontoxicity, low cost, easy availability and the like. In addition, incombustible liquids, such as flon, glycerin, and silicone oil, may also be used. The liquid (and the gas), together with the solid particles, can be allowed to collide against the transfer sheet. It is a matter of course that the liquid has a higher density than the gas and, hence, can more easily accelerate the solid particles than the gas.

The above various transfer methods permit the transfer sheet for provision of a pattern on a three-dimensional object according to the present invention to be used in applications where the transfer layer of the transfer sheet is transferred onto a three-dimensional object simultaneously with or after molding of the three-dimensional object to decorate the surface thereof with a transferred pattern. Three-dimensional objects of which the surface has been decorated by the transfer of a pattern may be used as decorative members in, for example, interior decoration of buildings, such as decoration of wall face, ceiling, floor and the like, surface decoration of fittings, such as sashes, doors, and hand rails, surface decoration of the cabinet of furniture, light electrical appliances and office automation equipment, interior decoration of vehicles, such as automobiles, electric cars, and aircrafts, or as containers, such as bottles, cans, boxes, and cups.

The following examples and comparative examples further illustrate the present invention but are not intended to limit it.

EXAMPLE 1

An olefinic thermoplastic elastomer, prepared by blending 100 parts by weight of a crystalline isotactic polypropylene as a hard segment with 10 parts by weight of a partially crosslinked hydrogenated styrene-butadiene rubber as a soft segment, was extruded through a T die into a 100 μm-thick substrate film.

A release layer of an acrylic resin was gravure-coated at a coverage of 2 g/m$^2$ (solid basis, the same shall apply hereinafter) onto the substrate film, a woodgrain pattern layer of a mixed resin composed of an acrylic resin and a nitrocellulosic resin was gravure-coated thereon, and an adhesive layer of a polyamide resin was then gravure-coated thereon at a coverage of 30 g/m$^2$, thereby preparing a transfer sheet for provision of a pattern on a three-dimensional object according to the present invention.

The above transfer sheet was used to conduct transfer of a pattern onto a three-dimensional surface of a wooden shaped object composed of MDF by a vacuum press transfer process using an apparatus and a method shown in FIG. 2. As a result, the transfer sheet conformed to the shape of the irregular surface of the wooden shaped object, and no failure to transfer occurred. Further, uneven or distorted pattern derived from the necking of the substrate (film) or by the influence of uneven temperature during the heating of the transfer sheet was not observed. Thus, a three-dimensional object, with a pattern, possessing a good appearance could be prepared.

EXAMPLE 2

An olefinic thermoplastic elastomer, as described in Japanese Patent Publication No. 23278/1994, comprising a soft polypropylene, which is a mixture of a hard segment with a soft segment (E2900, manufactured by Idemitsu Petrochemical Co., Ltd.), was extruded through a T die into a 70 µm-thick substrate film.

A release layer of a urethane resin was gravure-coated at a coverage of 2 g/m$^2$ (solid basis, the same shall apply hereinafter) onto the substrate film, a woodgrain pattern layer of a mixed resin composed of an acrylic resin and a nitrocellulosic resin was gravure-coated thereon, and an adhesive layer of an acrylic resin was then gravure-coated thereon at a coverage of 10 g/m$^2$, thereby preparing a transfer sheet for provision of a pattern on a three-dimensional object according to the present invention.

An injection molding/pattern transfer process using an apparatus and a method shown in FIG. 3 was carried out wherein the above transfer sheet was used and an ABS resin was used as an injection molding resin to conduct preforming using an injection mold. As a result, the transfer sheet conformed to the shape of the irregular surface of the resin molding, and the resultant three-dimensional object, with a pattern, thus obtained had a good appearance without a failure to transfer and uneven or distorted pattern.

COMPARATIVE EXAMPLE 1

A transfer sheet for provision of a pattern on a three-dimensional object was prepared in the same manner as in Example 1, except that, instead of the olefinic thermoplastic elastomer film, a 90 µm-thick crystalline, biaxially stretched isotactic polypropylene film (manufactured by Idemitsu Petrochemical Co., Ltd.) was used as the substrate. This was used to transfer a pattern on a wooden shaped object of MDF by the vacuum pressure transfer process in the same manner as in Example 1. As a result, due to unsatisfactory adhesion between the substrate and the release layer, the adhesion is so low that friction created at the time of mounting the transfer sheet on the apparatus caused part of the pattern to be separated from the transfer sheet, resulting in omission of the pattern. Further, necking occurred at the corner of the formed object, resulting in the formation of an uneven, distorted, and whitened, transferred pattern.

COMPARATIVE EXAMPLE 2

A transfer sheet for provision of a pattern on a three-dimensional object was prepared in the same manner as in Example 2, except that, instead of the olefinic thermoplastic elastomer film, a 90 µm-thick crystalline, biaxially stretched isotactic polypropylene film (manufactured by Idemitsu Petrochemical Co., Ltd.) as used in Comparative Example 1 was used as the substrate. Transfer of this transfer sheet was performed, using an ABS resin as the injection molding resin, by the injection molding/pattern transfer process in the same manner as in Example 2. As a result, due to unsatisfactory adhesion between the substrate and the release layer, the adhesion was so low that, when the transfer sheet is mounted on the molding machine, separation of the pattern occurred, resulting in omission of the pattern. Further, necking occurred at the corner of the object, resulting in the formation of an uneven, distorted, and whitened, transferred pattern.

EXAMPLE 3

Transfer sheet

A polypropylene thermoplastic elastomer comprising 90% by weight of isotactic polypropylene, 10% by weight of atactic polypropylene, and 1000 ppm of erucic amide were extruded through a T die into a 100 µm-thick substrate film.

A releasable ink of a polyvinylbutyral resin was rotogravure-printed on the substrate film to form a release layer, and a woodgrain pattern of three colors was then rotogravure-printed using an ink, for a pattern, composed of a nitrocellulosic resin to form a pattern layer, thereby forming a transfer layer. Thus, a transfer sheet of the present invention was prepared.

Transfer

Figure 12:
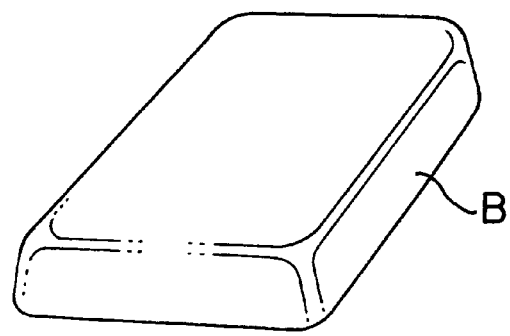
FIG. 12 is a diagram showing MDF (medium-density fiber board), for a kitchen door, as an embodiment of the object.

An object (see FIG. 12), with a rectangular parallelopiped shape, having a thickness of 30 mm, a length of 150 mm, and a width of 100 mm with the radius of the roundness of the corner being 18 mm was provided as MDF (medium-density fiber board) in the form of a kitchen door. An urethane adhesive (CVC45L, manufactured by Konishi Co., Ltd.) was spray coated on the surface of this object.

Thereafter, the transfer of the transfer layer was performed by the vacuum press transfer method as shown in FIG. 2. Specifically, the transfer sheet was put on and covered the object so that the transfer layer faced the object. In this state, the transfer sheet was heated to 100° C. by means of an infrared heater to soften the sheet, followed by vacuum suction from the object side, thereby transferring the transfer layer of the transfer sheet onto the object. As a result, the transfer sheet conformed to the shape of the irregular surface of the object, and no failure to transfer occurred. Further, necking of the substrate film did not occur, and unevenly distorted pattern was not observed. Thus, a three-dimensional object, with a pattern, possessing a good appearance could be prepared as a decorative material for interior decoration. Finally, a transparent two-component curable urethane paint composed of acrylic polyol and hexamethylene diisocyanate was coated on the surface of the object with a pattern.

EXAMPLE 4

Transfer sheet

A polypropylene thermoplastic elastomer comprising 80% by weight of isotactic polypropylene, 20% by weight of atactic polypropylene, and 1000 ppm of erucic amide were extruded through a T die into an 80 µm-thick substrate film.

A releasable ink of a two-component curable urethane composed of polyester polyol and tolylene diisocyanate rotogravure-printed on the substrate film to form a release layer, an ink for a pattern (BC72, prepared by Showa Ink Ind. Co., Ltd.) composed of a mixture of acrylic resin with vinyl chloride/vinyl acetate copolymer was printed on the release layer to form a pattern layer having a grain pattern, and an adhesive ink composed of a vinyl chloride/vinyl acetate copolymer was then rotogravure-printed to form an adhesive layer, thereby forming a transfer layer. Thus, a transfer sheet of the present invention was prepared.

Transfer

The above transfer sheet was used for transfer of the transfer layer by injection molding/pattern transfer method wherein preforming was conducted using an injection mold. At the outset, as shown in FIG. 3, the transfer sheet was inserted into an injection mold so that the transfer layer faced an injection molding resin. The transfer sheet was then heated by a hot plate at 100° C., thereby softening the transfer sheet which was preformed by vacuum forming on the female mold side, followed by mold clamping. Thereafter, injection molding was performed as follows. A molten ABS resin was injected and filled into a cavity through a gate of the male mold, followed by cooling. As a result, the transfer sheet conformed to the shape of the irregular surface of the object, and no failure to transfer occurred. Further, necking of the substrate film did not occur, and unevenly distorted pattern was not observed. Thus, a three-dimensional plastic molded product, with a pattern, possessing a good appearance could be prepared.

EXAMPLE 5

Transfer sheet

A polypropylene thermoplastic elastomer comprising 55% by weight of isotactic polypropylene, 45% by weight of atactic polypropylene, and 1000 ppm of erucic amide were extruded through a T die into a 100 μm-thick substrate film.

A brick pattern was rotogravure-printed, using an acrylic polyol ink for a pattern, directly on the substrate to form a pattern layer as a transfer layer. Thus, a transfer sheet of the present invention was prepared.

Transfer

Figure 13A:
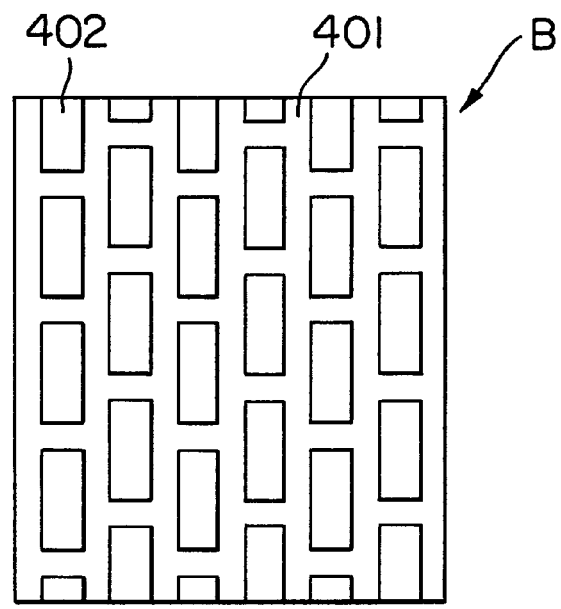
FIG. 13 (A) is a diagram (a plan view) showing an embodiment of an object having surface irregularities of a brick pattern.
Figure 13B:
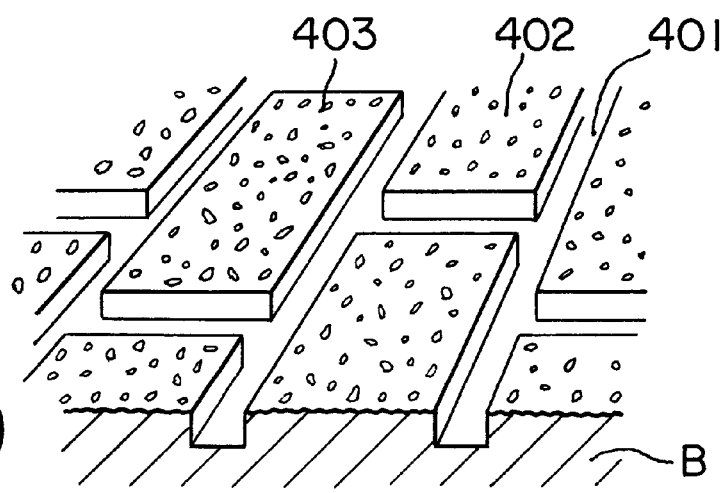

A urethane adhesive was spray-coated onto a calcium silicate board, as shown in a plan view of FIG. 13(A) and a partially enlarged view of FIG. 13(B), which, on the surface, has a concave section 401 as a joint of the brick pattern having a width of 6 mm and a depth of 2 mm and a flat convex section 402, of the brick portion, as large irregularities with fine irregularities 403 being provided on the flat convex section 402. The above object was then covered with the transfer sheet so that the transfer layer faced the object. The above transfer sheet was then heated to 100° C. and softened, and zinc beads, which were spherical and had an average particle diameter of 0.3 mm, were allowed to collide against the substrate side of the transfer sheet at an average speed of 35 m/sec to depress the transfer sheet, followed by cooling and the removal of the substrate (see FIG. 5). As a result, the transfer sheet conformed to the shape of the irregular surface of object, and no failure to transfer occurred. Further, necking of the substrate film did not occur, and unevenly distorted pattern was not observed. Thus, a three-dimensional object, with a pattern, possessing a good appearance could be prepared as a decorative material for exterior decoration which could be used as a decorated ceramic panel. Finally, a transparent urethane paint was coated on the surface of the panel.

EXAMPLE 6

Transfer sheet and transfer

A transfer sheet was prepared in the same manner as in Example 3, except that the polypropylene thermoplastic elastomer comprised 95% by weight of isotactic polypropylene, 5% by weight of atactic polypropylene, and 1000 ppm of erucic amide and the thickness of the substrate was 100 μm. Thereafter, the transfer layer was transferred onto an object of MDF in the same manner as in Example 3. As a result, the transfer sheet conformed to the shape of the irregular surface of object, and no failure to transfer occurred. Further, necking of the substrate film did not occur, and unevenly distorted pattern was not observed. Thus, a three-dimensional object, with a pattern, possessing a good appearance could be prepared as a decorative material for interior decoration.

EXAMPLE 7

A transfer sheet was prepared in the same manner as in Example 3, except that a 100 μm-thick packaging grade film of a polypropylene thermoplastic elastomer comprising 97% by weight of isotactic polypropylene, 3% by weight of atactic polypropylene, and 1000 ppm of erucic amide was used as the substrate. Thereafter, the transfer layer was transferred onto an object of MDF in the same manner as in Example 1. As a result, the transfer sheet conformed to the shape of the irregular surface of the object, and no failure to transfer occurred. However, necking of the substrate occurred, and the pattern was locally unevenly distorted. Thus, the resultant three-dimensional object with a pattern had a poor appearance.

EXAMPLE 8

Printing of a transfer layer was performed by rotogravure printing in the same manner as in Example 3, except that a 100 μm-thick film of a polypropylene thermoplastic elastomer comprising 35% by weight of isotactic polypropylene, 65% by weight of atactic polypropylene, and 1000 ppm of erucic amide was used as the substrate.

However, the tension of the substrate film created at the time of feeding and heating in the ink drying zone (hot air of 40° C. caused elongation of the substrate film, resulting in misregistration. Further, continuation of printing caused breaking of the film. As a result, no good transfer sheet could be prepared.

What is claimed is:

1. A transfer sheet for provision of a pattern on a three-dimensional object, comprising: an olefinic thermoplastic elastomer film as a substrate film; and at least a pattern layer as a transfer layer provided on the substrate.

2. The transfer sheet according to claim 1, wherein the olefinic thermoplastic elastomer comprises a mixture of an isotactic polypropylene and an atactic polypropylene with the proportion of the atactic polypropylene in the mixture being 5 to 50% by weight.

3. The transfer sheet according to claim 1, wherein the olefinic thermoplastic elastomer is selected from the group consisting of:

(1) a soft polypropylene comprising a mixture of (A) 10 to 90% by weight of an atactic polypropylene, as a soft segment, having a number average molecular weight Mn of not less than 25,000 and a ratio of weight average molecular weight Mw to number average molecular weight Mn, i.e., Mw/Mn, of 7 or less, and soluble in boiling heptane with (B) 90 to 10% by weight of an isotactic polypropylene, as a hard segment, having a melt index of 0.1 to 4 g/10 min and insoluble in boiling heptane, (2) an olefinic elastomer prepared by homogeneously blending (C) an olefin crystalline polymer as a hard segment with (D) a monoolefin copolymer rubber as a soft segment (monoolefin rubber/olefin polymer weight ratio=50/50 to 90/10), (3) an olefinic elastomer prepared by mixing (E) an uncrosslinked monoolefin copolymer rubber soft segment with (F) an olefinic crystalline copolymer hard segment and a crosslinking agent and dynamically performing partial crosslinking while heating and applying shear stress (monoolefin rubber (E)/olefinic copolymer (F) weight ratio=60/40 to 80/20), (4) an olefinic elastomer prepared by mixing (G) a peroxide-decomposable olefin polymer hard segment, (H) a peroxide-crosslinkable monoolefin copolymer rubber soft segment, (I) a peroxide-noncrosslinkable hydrocarbon rubber (a component serving both as a soft segment and as a fluidity modifier) and (J) a mineral oil softener, and dynamically heat-treating the mixture in the presence of an organic peroxide with (G)=90 to 40 parts by weight, (H)=10 to 60 parts by weight, (G)+(H)=100 parts by weight, (I) and/or (J)=5 to 100 parts by weight), (5) an olefinic thermoplastic elastomer comprising an ethylene/styrene/butylene copolymer and (6) any of the olefinic thermoplastic elastomers (1) to (5) having a hydroxyl group and/or a carboxyl group functioning as a polar group.

* * * * *